(12) United States Patent
Granston et al.

(10) Patent No.: US 7,237,234 B2
(45) Date of Patent: Jun. 26, 2007

(54) METHOD FOR SELECTIVE SOLICITATION OF USER ASSISTANCE IN THE PERFORMANCE TUNING PROCESS

(75) Inventors: Elana D. Granston, Sugarland, TX (US); Jonathan F. Humphreys, Missouri City, TX (US); David H. Bartley, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 608 days.

(21) Appl. No.: 10/317,786

(22) Filed: Dec. 12, 2002

(65) Prior Publication Data

US 2003/0140334 A1 Jul. 24, 2003

Related U.S. Application Data

(60) Provisional application No. 60/341,594, filed on Dec. 13, 2001.

(51) Int. Cl.
*G06F 9/45* (2006.01)
(52) U.S. Cl. ............ 717/151; 717/140; 717/130; 717/131; 717/154; 717/158
(58) Field of Classification Search ............ 717/9–158; 716/1–18; 700/181
See application file for complete search history.

(56) References Cited

U.S. PATENT DOCUMENTS

| 5,133,072 | A |   | 7/1992  | Buzbee |
|-----------|---|---|---------|--------|
| 5,230,050 | A | * | 7/1993  | Iitsuka et al. ............... 717/145 |
| 5,258,919 | A |   | 11/1993 | Yamanouchi et al. |
| 5,553,002 | A | * | 9/1996  | Dangelo et al. .............. 716/11 |
| 5,613,118 | A |   | 3/1997  | Heisch et al. |
| 5,815,720 | A |   | 9/1998  | Buzbee |
| 5,960,202 | A |   | 9/1999  | Granston et al. |
| 5,966,538 | A |   | 10/1999 | Granston et al. |
| 6,115,646 | A | * | 9/2000  | Fiszman et al. ............ 700/181 |
| 6,219,825 | B1| * | 4/2001  | Burch et al. ................. 717/158 |
| 6,760,888 | B2| * | 7/2004  | Killian et al. ................... 716/1 |
| 2001/0032332 | A1 | * | 10/2001 | Ward et al. ..................... 717/9 |
| 2002/0087949 | A1 | * | 7/2002  | Golender et al. ........... 717/124 |

(Continued)

OTHER PUBLICATIONS

Granston, Elana D; Veidenbaum, Alexander V. Proceedings of Supercomputing 1991.*

(Continued)

*Primary Examiner*—Meng-Al T. An
*Assistant Examiner*—Mark P. Francis
(74) *Attorney, Agent, or Firm*—Robert D. Marshall, Jr.; W. James Brady; Frederick J. Telecky, Jr.

(57) ABSTRACT

A compiler tool is provided to selectively solicit assistance from a programmer in order to improve optimization of code compiled by the compiler. As a program is being compiled, the compiler keeps track of the places where it could do better if it only knew certain information. The user is presented with one or more pieces of advice that each identify a problem that prevented the compiler from making a particular optimization due to not enough information and one or more suggestions as to how to provide additional information to the compiler. This list is generally filtered so that only a subset of missing information that has a high likelihood of leading to better performance is presented. Other missing information is not requested.

13 Claims, 9 Drawing Sheets

U.S. PATENT DOCUMENTS

| | | | |
|---|---|---|---|
| 2002/0129335 A1* | 9/2002 | Lewis | 717/124 |
| 2003/0023961 A1* | 1/2003 | Barsness et al. | 717/152 |
| 2003/0088854 A1* | 5/2003 | Wygodny et al. | 717/130 |
| 2003/0208723 A1* | 11/2003 | Killian et al. | 716/1 |
| 2004/0250231 A1* | 12/2004 | Killian et al. | 716/18 |

OTHER PUBLICATIONS

Bartley, David H; Software- Practice and Experience v 22 n 22 Feb. 1992 p. 101-110.*

Tamam, Olivier; Granston, Elana D; Jalby, William; Proceedings of the Supercomputing '93 Conference 1993.*

Elana Granston, et al.; paper: *Automatic Recommendation of Compiler Options*, Texas Instruments Incorporated.

Pohua P. Change, et al.; *Using Profile Information to Assist Classic Code Optimizations*, Software—Practice and Experience, vol. 21(12), Dec. 1991, pp. 1301-1321.

David F. Bacon, Compiler Transformations for High-Performance Computing, ACM Computing Surveys, vol. 26, No. 4, Dec. 1994, pp. 345-420.

Texas Instruments Incorporated, TMS320C55x Optimizing C/C++ Compiler User's Guide, Literature No. SPRU281C, Jun. 2001., Chapter 3, pp. 3-1-3-45.

* cited by examiner

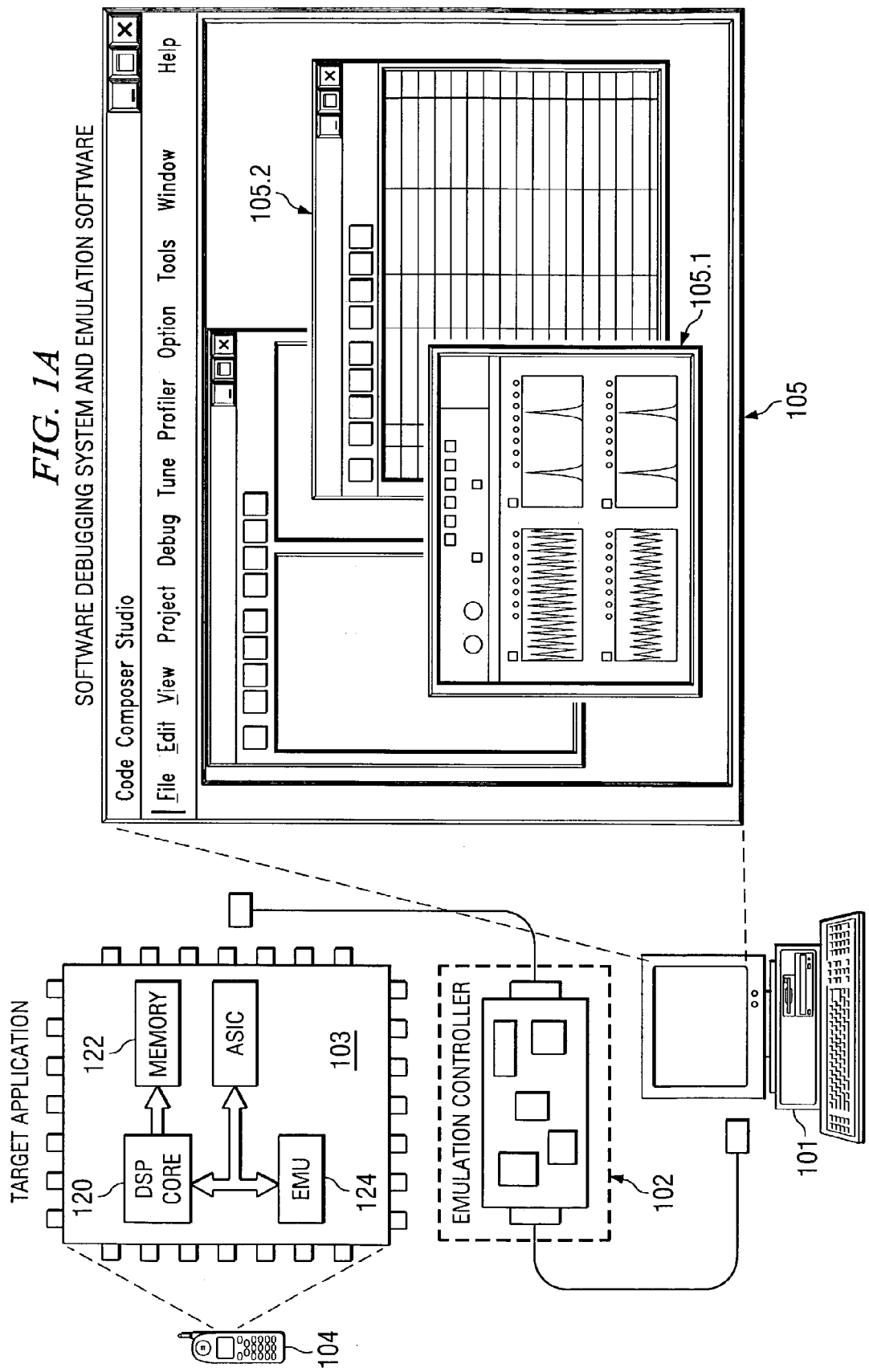

FIG. 4

Loop Performance 5 loops   3 cif file(s)   Reload current file(s)   Select new file(s)

| | Loop | Function | Cycles Per Iteration | Startup (Cycles) | Analysis | Advice |
|---|---|---|---|---|---|---|
| 400.1 | lines : 5-6 | /fileA.c : no_opt () | 20 | 0 | • Software pipelining disabled. | Yes (2) |
| 400.2 | lines : 6-9 | /includeB.h : callee1 () | N/A | 0 | • Software pipelining failed. • Loop contains function call. • Loop unrolled 2X. | Yes (2) |
| 400.3 | lines : 10-11 | /fileB.c : caller () | 1 | 6 | • Redundant loop generated. • Lacking minimum trip count information. | Yes (3) |
| 400.4 | lines : 15-21 | /fileB.c : caller () | 9 | 5 | • Due to resource constraints, cycles/iteration must be >= 3. | No |
| 400.5 | lines : 17-32 | /flt_coldet.c : colldet_cn() | 33 | 0 | • Software pipelining failed. • Did not find a schedule. | Yes (1) |

FIG. 5

| Loop | EXPLANATORY TEXT | Cycles Per Iteration | Startup (Cycles) | Analysis | Advice |
|---|---|---|---|---|---|
| lines : 5-6 | /fileA.c : no_opt () | 20 | 0 | • Software pipelining disabled. | Yes (2) |
| lines : 6-9 | /includeB.h : callee1() | N/A | 0 | • Software pipelining failed.<br>• Loop contains function call.<br>• Loop unrolled 2X. | Yes (2) |
| lines : 10-11 | /fileB.c : caller () | 1 | 6 | • Redundant loop generated.<br>• Lacking minimum trip count information. | Yes (3) |
| lines : 15-21 | /fileB.c : caller () | 9 | 5 | • Due to resource constraints, cycles/iteration must be >= 3. | No |
| lines : 17-32 | /flt_coldet.c : colldet_cn() | 33 | 0 | • Software pipelining failed.<br>• Did not find a schedule. | Yes (1) |

Redundant Loop

| Feedback for Loop: caller() : /fileB.c : 10-11 | |
|---|---|
| 601 — Alignment Advice for y<br>Problem:<br><br>EXPLANATION | 1. #include "includeB.h"<br>2.<br>3. foo(int n) { return 5; }<br>4.<br>5. caller(short *x, short * restrict y, short *z, int n)<br>6. {<br>7.   int i;<br>8.                                                   610<br>9.   if (n<300)<br>10.     for (i=0; i<4*n; i++)<br>11.       x[i] = y[i];<br>12.<br>13.   callee1(n,z,x);<br>14.<br>15.   for (i=0; i<7; i++)<br>16.   {<br>17.     if (x[i])<br>18.       y[i] = z[i];<br>19.     else if (y[i])<br>20.       y[i] = 2*x[i];<br>21.   }<br>22. } |
| 602 — Suggestion:<br><br>EXPLANATORY TEXT<br><br>Example | |
| 603 — Alternate Suggestion:<br><br>EXPLANATORY TEXT | |
| 604 — Advice 1 of 3<br>◀ PREV    NEXT ▶ | /fileB.c-22 lines<br>◀ PREV    NEXT ▶ |

FIG. 7

Feedback for Loop: /Demo/fileB.c : 10-11

| Alignment Advice for y | |
|---|---|
| Problem: EXPLANATION | 1. #include "includeB.h"<br>2.<br>3. foo(int n) { return 5; }<br>4.<br>5. caller(short *x, short * restrict y, short *z, int n)<br>6. {<br>7.    int i;<br>8.<br>9.    if (n<300) |
| Suggestion: EXPLANATORY TEXT<br><br>Example | 10.     for (i=0; i<4*n; i++)<br>11.       x[i] = y[i]; |

Example

Use an _nassert to tell the compiler that the alignment of a must be at least 4 bytes.

BEFORE:
```
funcA(char *a)
{
  int i;

for {i = 0; i < 100: i++)
    a[i] = 0;
}
```

AFTER:
```
funcA(char *a)
{
  int i;

_nassert((int) a % 4 == 0);

for {i = 0; i < 100; i++)
    a[i] = 0;
}
```

Alternate Suggestion: EXPLANATORY TEXT

Advice 1 of 3
◀ PREV    NEXT ▶

FIG. 8

Feedback for Loop: caller()/fileB.c : 10-11

| Suggestion: | 1. #include "includeB.h" |
| --- | --- |
| EXPLANATORY TEXT | 2.<br>3. foo(int n) { return 5; }<br>4.<br>5. caller(short *x, short * restrict y, short *z, int n)<br>6. { |
| Example | 7.    int i;<br>8. |
| Alternate Suggestion: | 9.    if (n<300) |
|  | 10.       for (i=0; i<4*n; i++)<br>11.          x[i] = y[i]; |
| EXPLANATORY TEXT | 12.<br>13.    callee1(n,z,x);<br>14. |

800

603

801

C Example   C++Example

Advice 1 of 3

◀ PREV    NEXT ▶

C Example

Use a DATA_ALIGN pragma to tell the compiler that the alignment for arrays a and b must be at least 4 bytes.

BEFORE:          AFTER:

```
                 #pragma DATA_ALIGN(a,4) ;
int a[500];      int a[500];

int b[300];      int b[300];
                 #pragma DATA_ALIGN(b,4) ;
```

FIG. 9

```
901     Feedback for Loop: colldet_cn():/fit_coldet.c : 17-32
```

| Options Advice: -mh<br>Problem:<br><br>EXPLANATION | 10. short i;<br>11. float sum0, sum1, dist0, dist1;<br>12.<br>13. //_nassert((num>=4) && (num%2 == 0));<br>14. DWORD_ALIGNED(x);<br>15. DWORD_ALIGNED(p);                    900<br>16. #pragma MUST_ITERATE(2, , ) |
|---|---|
| Suggestion:<br>                903<br>Add the option<br>    -mh or mhn.<br>where n is at least 336.<br>902 | 17. for (i=0; i<(num*3); i+=6) {<br>18.    sum0=x[i+0]*p[0]+x[i+1]*p[1]+x[i+2]*p[2];<br>19.    sum1=x[i+3]*p[0]+x[i+4]*p[1]+x[i+5]*p[2];<br>20.    dist0=sum0 - point;<br>21.    dist1=sum1 - point;<br>22.    dist0=fabs(dist0);<br>23.    dist1=fabs(dist1);<br>24.    if (dist0 < distance) {<br>25.       retval = (int)&x[i+0]; |

```
            EXPLANATION OF -MH OPTION
                       910
```

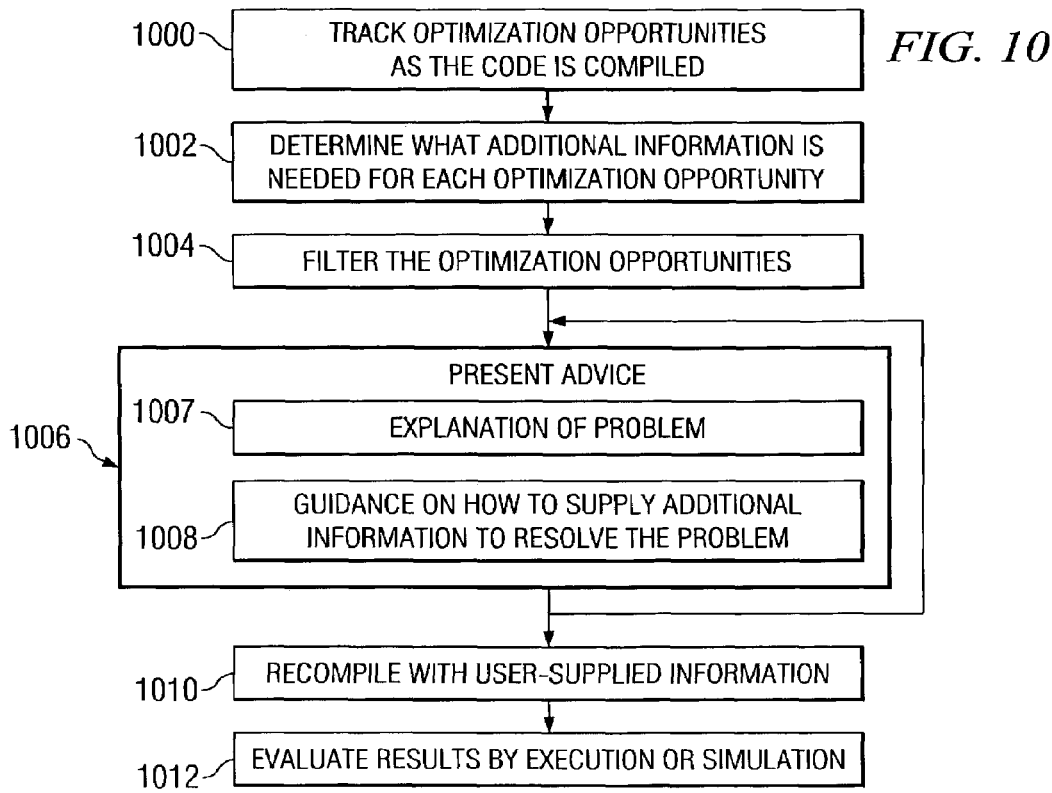

FIG. 10

1000 — TRACK OPTIMIZATION OPPORTUNITIES AS THE CODE IS COMPILED

1002 — DETERMINE WHAT ADDITIONAL INFORMATION IS NEEDED FOR EACH OPTIMIZATION OPPORTUNITY

1004 — FILTER THE OPTIMIZATION OPPORTUNITIES

1006 — PRESENT ADVICE
- 1007 — EXPLANATION OF PROBLEM
- 1008 — GUIDANCE ON HOW TO SUPPLY ADDITIONAL INFORMATION TO RESOLVE THE PROBLEM

1010 — RECOMPILE WITH USER-SUPPLIED INFORMATION

1012 — EVALUATE RESULTS BY EXECUTION OR SIMULATION

METHOD FOR SELECTIVE SOLICITATION OF USER ASSISTANCE IN THE PERFORMANCE TUNING PROCESS

This application is related to and claims priority under 35 USC §119 (e) (1) to Provisional Application Ser. No. 60/341,594, "Method for Selective Solicitation of User Assistance in the Performance Tuning Process"filed on Dec. 13, 2001.

FIELD OF THE INVENTION

This invention generally relates to microprocessors, and more specifically to improvements in software development technology for compiling a program to execute on a microprocessor

BACKGROUND OF THE INVENTION

Microprocessors are general-purpose processors that provide high instruction throughputs in order to execute software running thereon, and can have a wide range of processing requirements depending on the particular software applications involved. Many different types of processors are known, of which microprocessors are but one example. For example, Digital Signal Processors (DSPs) are widely used, in particular for specific applications, such as mobile processing applications. DSPs are typically configured to optimize the performance of the applications concerned and to achieve this they employ more specialized execution units and instruction sets. Particularly in applications such as mobile telecommunications, but not exclusively, it is desirable to provide ever increasing DSP performance while keeping power consumption as low as possible.

Several types of tools to help tune source code are known that produce programs that execute with improved performance. For example, Code Coach (part of Vtune suite developed by Intel) suggests source code transformations but does not solicit information. For example, if a loop contains an operation that only needs to be done once, Vtune may suggest the user rewrite the loop to move-the operation outside of the loop.

Balancing tools such as PBC (Texas Instruments) and CodeBalance (Greenhills) compile code using several different options, execute the resulting code and measure the code size and performance. The results are provided to a user who can then select various compiler options based on the user's desire to trade off code size and performance. Thus, these tools focus on automatically determining tradeoffs between code size and performance.

Parascope (research project at Rice) allows users to suggest the transformations that a compiler should perform. This tool is aimed at very sophisticated, compiler-literate users who want to focus on a small piece of code.

Another category of tools helps users identify hot pieces of code on which the user may then focus their attention. Vtune is one such tool, among others. There are also visualization tools for identifying memory usage patterns and layout issues that are problematic, such as the Cache Visualization Tool (Leiden Univ.) and Munin (U.S. patent application Ser. No. 10/191,175 now U.S. Patent No. 6,947,052. While these tools help a user visualize what's going on in "hot" pieces of code, they don't make recommendations for how to fix the problems.

SUMMARY OF THE INVENTION

In general, and in a form of the present invention, as a program is being compiled, the compiler keeps track of the places where it could do better if it only knew certain information. The user is presented with one or more pieces of advice that each identify an issue that prevented the compiler from making a particular optimization due to not enough information and one or more suggestions as to how to provide additional information to the compiler.

The set of advices are generally filtered so that those presented only include a subset of missing information that has a high likelihood of leading to better performance. Other missing information is not requested.

One embodiment of the invention performs the following steps: tracking optimization opportunities as the code is compiled wherein the optimization opportunities tracked are related to code segments that a compiler could compile differently if the compiler had additional information; determining what additional information is needed for each optimization opportunity; presenting requests for the additional information to the user; and telling the user how to supply the additional information for each request.

BRIEF DESCRIPTION OF THE DRAWINGS

Particular embodiments in accordance with the invention will now be described, by way of example only, and with reference to the accompanying drawings in which:

FIG. 1A illustrates an embodiment of the present invention in a software development system for embedded applications;

FIG. 4 a view of an advisory screen displayed by the consultant tool on the user interface of the system of FIG. 1A;

FIG. 5 illustrates an dialog box for explaining a selected item on the advisory screen;

FIG. 6 illustrates an advice screen that include a problem explanation and guidance on how to supply the additional information to resolve the problem;

FIG. 7 illustrates an example of how to supply additional information;

FIG. 8 illustrates another example of how to supply additional information;

FIG. 9 illustrates another advice screen with guidance on how to supply the additional information to satisfy another problem, showing an option dialog box that explains the option; and FIG. 10 is a flow chart illustrating operation of the compiler consultant.

Corresponding numerals and symbols in the different figures and tables refer to corresponding parts unless otherwise indicated.

DETAILED DESCRIPTION OF EMBODIMENTS OF THE INVENTION

Figure 1B:
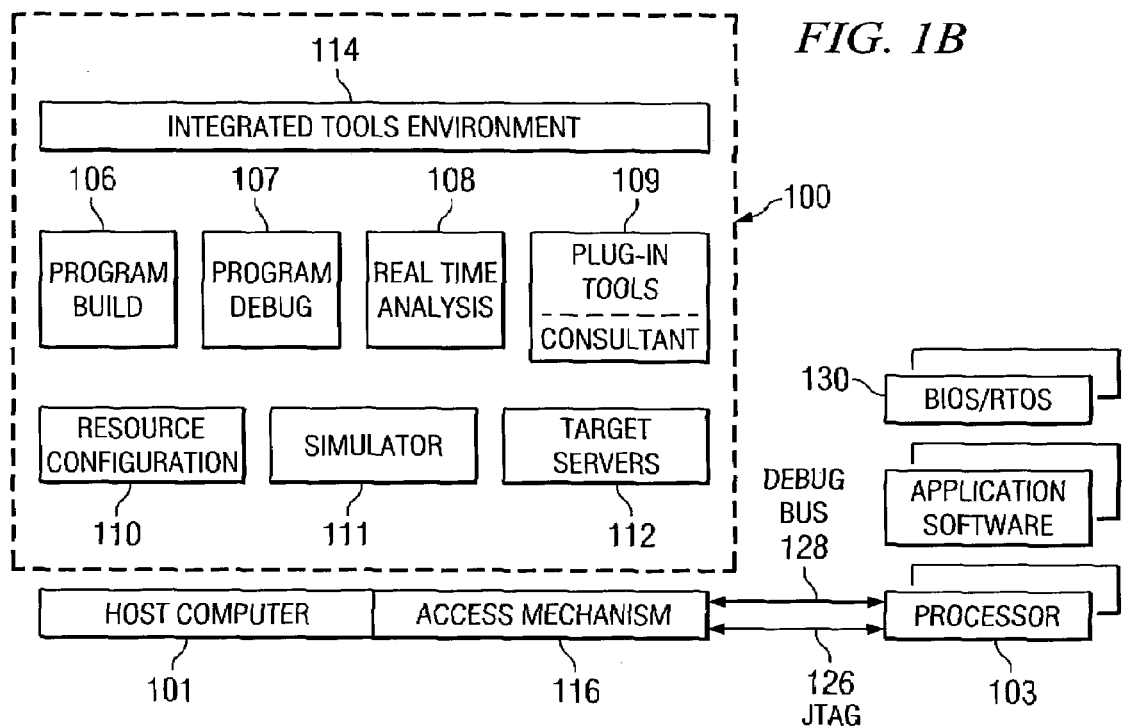
FIG. 1B is a block diagram of the logical architecture of the software development system of FIG. 1A.

Although the invention finds particular application to compiling code for Digital Signal Processors (DSPs), implemented, for example, in an Application Specific Integrated Circuit (ASIC), it also finds application to other forms of processors. An ASIC may contain one or more megacells which each include custom designed functional circuits combined with pre-designed functional circuits provided by a design library, as illustrated by digital system 103 in FIG. 1A.

In the following descriptions, the term "user" refers to a programmer or equivalent person who is creating a program to be executed on a digital system, such as digital system 103.

Users rarely achieve the performance of which the compiler and target architecture are capable. They often get frustrated when the compiler does not give them the performance they expect and they want to know why. What/where is the problem? This is an issue addressed by the present invention; one embodiment being referred to herein as the compiler consultant (or consultant for short).

In prior attempts at tools to help tune source code, there is generally no filtering or selectivity. Additionally, the information generally pertains to an application level, i.e., must be applicable to entire application or at least all files under consideration. Most users cannot confidently make assertions about the program as a whole. Hence, although the consultant may provide advice regarding global information, this is not a focus of the consultant. Instead, the consultant points out a specific optimization problem relating to a small code segment that could be resolved with additional information that pertain only to a certain program point or with regards to a specific variable. Another difference is that the consultant only requests information which has a high likelihood of leading to improved performance based on compile-time analysis.

As mentioned earlier, some compilers, such as Parascope (research project at Rice) allow users to suggest the transformations that a compiler should perform. These tools are aimed at very sophisticated, compiler-literate users who want to focus on a small piece of code. In contrast, the consultant is especially targeted toward novice users, though it provides some useful feedback for advanced users as well.

In more detail, optimizing compilers attempt to transform code sequences into equivalent code sequences that produce the same results but run faster. Each transformation can only be performed if its safety and profitability criteria are met. Many times the compiler is prevented from applying performance-enhancing transformations because it is missing information that cannot be gleaned automatically.

However, users don't know what information the compiler is missing. Additionally, they are unaware of simple things that they can do but a compiler cannot, such as changing options, making algorithm-dependent source code modifications such as changing a variable type, etc. to easily improve performance.

Hence, they get frustrated and settle for sub-optimal performance or resort to hand-coded assembly code which is time consuming, error prone and much more difficult to maintain, extend and port.

Asking the user to simply provide everything he knows via assertions that are added to the code, for example, or even asking for all information that the compiler doesn't know would result in way too much information for a user to provide.

Conversely, a compiler that embodies aspects of the present invention keeps track of the places where it could likely do better if it only knew certain information as the program is being compiled. The user is presented advice on how to improve optimization. Each piece of advice includes a specific optimization problem relating to a small code segment that could be resolved with additional information that pertain only to a certain program point or with regards to a specific variable. This list only includes a selected subset of missing information that has a high likelihood of leading to better performance. Other missing information is not requested.

A common problem that users have is that the compiler isn't doing as good as they expect and they don't know why. The consultant addresses these issues by pinpointing the program locations where the following hold:

(1) the compiler is hindered from being able to apply optimizations that are likely to lead to better performance;

(2) there is something the user could potentially tell the compiler about the program that would allow the compiler to overcome this; and (3) optionally, these program segments are "hot", based on profile data.

Advantageously, this capability reduces program development time and frustration as well as the reliance on human consultants/experts to hold users' hands. The consultant can also educate external and in-house users of compiler tools. Moreover, it allows changes to the compiler and consequently the method for best using the compiler to be disseminated easily and quickly.

FIG. 1A illustrates an embodiment of the present invention in a software development system for embedded applications. While embedded applications for DSPs are an important target of the present invention, the present invention can also benefit program development for many other types of digital systems. General-purpose personal computer 101 is connected to target hardware 103 with emulation controller 102. Personal computer 101 hosts a software development system that incorporates software debugging and-emulation software with which the user interacts through user interface 105. Digital cellular telephone 104 is illustrative of one of the many ways in which the target hardware and accompanying software may be packaged. Target hardware 103 is a megacell that includes emulation/debug logic 124 to support software debugging activities as well as digital signal processor (DSP) 120 and memory 122. Details of general construction of DSPs are well known and may be found readily elsewhere. For example, U.S. Pat. No. 5,072,418 issued to Frederick Boutaud, et al, describes a DSP in detail. U.S. Pat. Nos. 5,329,471 and 5,828,824 issued to Gary Swoboda, et al, describes in detail how to test and emulate a DSP.

DSP 120 is connected to memory 122, which holds an application program that has been compiled and optimized by the development system and downloaded via emulation controller 102. Debug logic 124 interacts with emulation controller 102 during the debugging of the application program. Typically, emulation controller 102 is connected to target hardware 103 through a JTAG test port.

User interface 105 is a windows based graphical user interface (GUI). Other embodiments of the present invention may interact with a user through other types of user interfaces. Window 105.1 illustrates a performance monitor that displays the results of a program being executed on DSP 120, such as a signal processing application. Window 105.2 illustrates an advisory window provided by the consultant during compilation of the program being executed, which will be described in more detail below. The performance monitor provides one way in which the user can determine how well the program has been optimized. Various types of performances monitors and benchmarking techniques are known and will not be described further herein.

FIG. 1B is a block diagram of the logical architecture of an embodiment of software development system 100 with user interface 105 that executes on personal computer 101. This development system will be referred to herein as the integrated development environment (IDE). The IDE is comprised of a set of tightly integrated modules providing tools to support the entire software development process for DSP applications. At the top level, Integrated Tools Environment 114 comprises user interface 105, a source code editor, a code profiling tool, and a project management tool.

The second level of this architecture comprises the tools for generating code (block 106) that includes a compiler, for debugging code (block 107), and for analyzing the performance of the code in real-time (block 108). In addition, this level includes support for adding additional development tools as "plug-ins" (block 109). A "plug in" is a software application that may be dynamically added to the IDE to extend the functionality of the system. The compiler consultant is divided into two distinct architectural components: a consultant plug-in, and a consultant translator DLL (dynamic link library). This division was made in order to encapsulate Advice and Loop Table data generation (the Translator) from consultant code (the plug-in!. However, in other embodiments, a different arrangement could be done.

The third level provides the low-level support for debugging. It comprises an instruction set simulator (block 111) for host debugging, software for configuring the debug resources available on the target hardware (block 110), and software for interfacing to the target hardware (block 112).

An access mechanism 116 connects the host computer and the system 103. In this embodiment, access mechanism 116 is embodied by emulation controller 102; however, in other embodiments, debug resources can be accessed by other means, such as by a system bus, or by a wireless infrared or radio link, for example. Commands are sent to debug logic 124 via JTAG test port 126. Trace data is received on a debug bus 128. In this embodiment, the debug bus is a Real Time Data Exchange (RTDX) bus, such as described in U.S. patent application Ser. No. 09/578,516 now U.S. Pat. No. 6,543,048, filed 5/26/00, entitled "Debugger with Real-Time Data Exchange." BIOS/RTOS 130 provides basic operating system support for the application as well as some low level support enabling the application to run in real-time while debugging information is collected.

In this embodiment, only a single target system 103 is illustrated; however, more than one target system, as indicated by the dashed boxes, can be connected to access mechanism 116 and controlled by the software development system.

Figure 2:
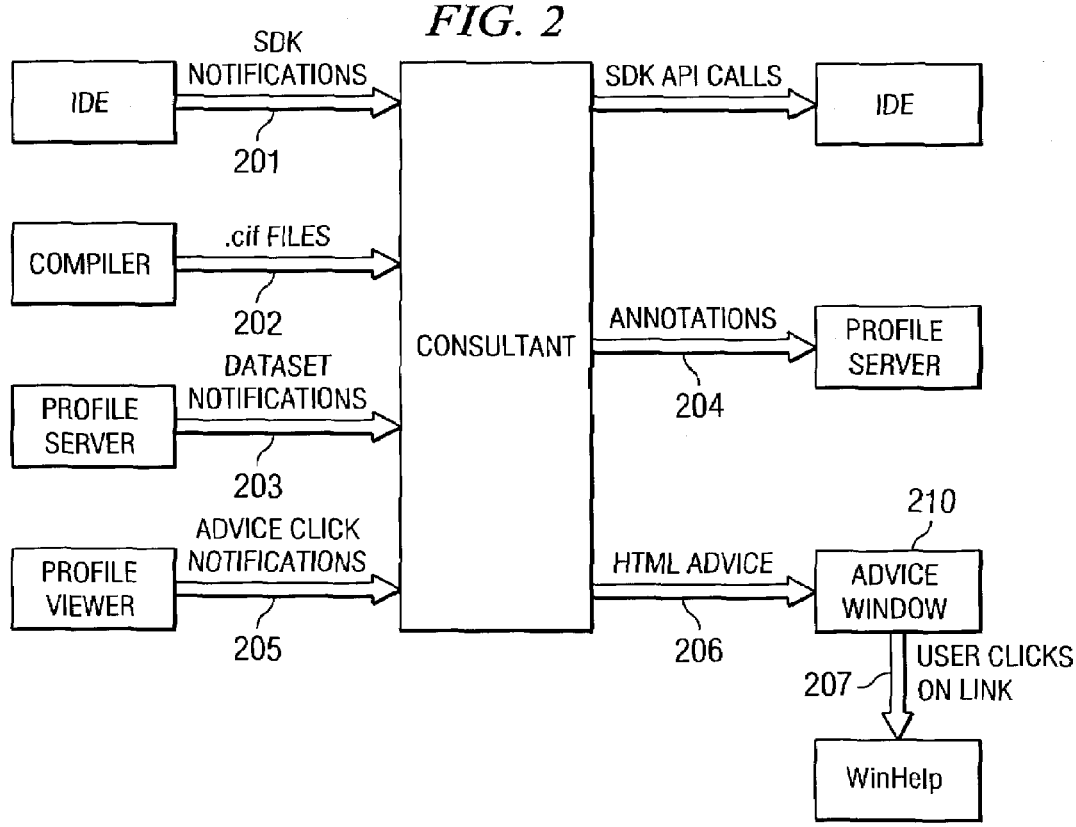
FIG. 2 is a flow diagram illustrating interaction between a consultant tool and other portions of the system of FIG. 1A.

FIG. 2 is a boundary diagram illustrating interaction between the consultant tool and other portions of the system of FIG. 1A. The boundary diagram gives the basic interaction between the consultant plug-in, IDE, the dashboard components, the profile server, and the help window (winhelp). "Dashboard" is a term used here to indicate the main window of the IDE that is displayed on user interface 105. Various selection tabs are provided to access advice window 210 and to launch various tuning tools. Inputs to, or calls into, consultant are on the left side of the diagram, and outputs from the consultant, or calls to other components made by consultant, are on the right side of the diagram. The Profile Server is a set of CCS SDK APIs that collects profile data from the user's target, Simulation or Emulation, and serves that data to its clients.

The operations are numbered as they might happen from startup of the IDE, through the steps of a use case where a user is asking for run time profiling information and using consultant.

In step 201, IDE starts and the consultant plug in, a command object, is created.

In step 202, the user compiles one or more files or builds an IDE project and the compiler creates the consultant intermediate files. The IDE notifies consultant that one or more compiles have taken place, and consultant creates the loop table information.

In step 203, at this point the user specifies that they want run time loop profile information in profile setup, runs the target program and collects this information.

When collection is complete, profile server notifies consultant that it can now annotate the profile server dataset with the static compiler information and read the run time loop profile information it needs to create any additional loop table information for the profile viewer display.

In step 204, consultant annotates the dataset with the loop table information and saves the consultant intermediate information in a profile server binary stream. This is done so that consultant can create loop advice when the user loads a saved profile server dataset without having to have the consultant intermediate files. The profile server notifies the profile viewer to retrieve and display the profile dataset information.

In step 205, once the information is displayed in the profile viewer, the user has the opportunity to click on the advice column for any loop. When the user clicks, profile viewer notifies consultant that the user clicked on a specific loop.

In step 206, consultant creates the advice for that loop, and places it into the consultant advice tab of the dashboard advice window.

In step 207, while viewing the advice, the user may click on compiler terminology or example code within the advice. The advice window contains vbscript code that brings up a help dialog window (winhelp) for the compiler terminology or example code the user clicked on.

Typically, a user will be in one of the four phases of program development described in Table 1.

TABLE 1

| | Project Development Stages |
|---|---|
| Loop Prototyping | The user is compiling standalone loop code (usually in one file, perhaps without even a IDE project), with only the intent to determine loop efficiency, and not to create linkable or executable code. The expected workflow for the user would be edit-compile-tune (using Consultant). |
| Compiling | The user is compiling application code in order to find and remove compiler bugs. The code is not linking and is not producing executable output. The user may still be doing tuning, but this is probably not primary focus at this point in time. The expected workflow for the user would be edit-compile-[maybe tune (using Consultant)]. |
| Debugging | The user's application is compiling and linking cleanly, producing an executable file. The user may still be doing tuning, but this is probably not primary focus at this point in time. The expected workflow for the user would be edit-build-run-debug-[maybe tune (using Consultant)]. |
| Tuning | The user's application has been debugged and the user is now attempting to tune the efficiency of code. The expected workflow for the user would be edit-build-run-tune (using Consultant). We recognize that the user may need to drop back to the Compiling and Debugging development stages when making tuning changes to the application. |

A second common use case involves the user not collecting run time loop profile information, but, still being in the loop prototyping stage of development, just viewing the static information collected by the compiler. In this case, step number 204 is eliminated.

The only interaction between the consultant and the profile viewer occurs when the user clicks on the cells of columns in the profile viewer display. A brief description of the expected actions is given later. When the user clicks in one of the profile viewer cells of a row and column that brings up the consultant advice for a specific loop. The profile viewer calls on the consultant plug in to display the advice for a specific loop. Consultant then communicates with the dashboard advice window to populate the consultant tab of the advice window with the advice for the specific loop the user has chosen.

Figure 3:
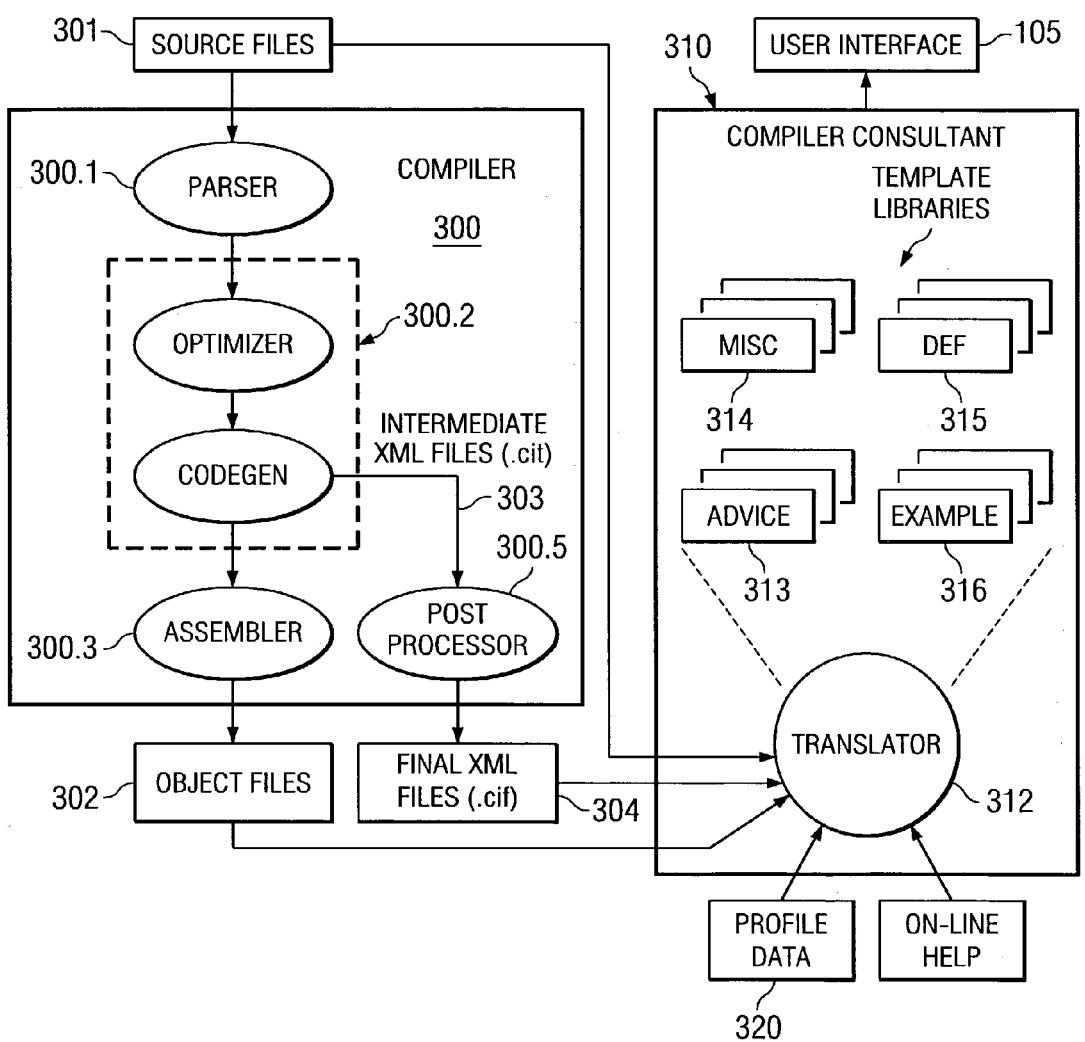
FIG. 3 is an illustration of files used by the consultant tool.

FIG. 3 is an illustration of files used by the consultant tool. Compiler 300 reads a source code file 301 and produces an object file 302 using known compilation techniques. The compiler includes parser module 300.1, optimizer and code generation module 300.2, assembler 300.1, and post processor 300.5. The optimizer and code generation module operate in a typical manner, except that for each optimization opportunity for which the compiler needs more information, an entry is made to a temporary data structure. At the completion of the compilation, the temporary data structure is formatted and stored to a consultant intermediate temporary (cit) XML file 303. This often results in a large number of information requests for related data references. Post processor 300.5 examines the CIT files and filters out related or duplicate requests and then selects the ones that have the most likelihood of yielding better compilation results and stores these selected requests in consultant intermediate files (cif) 304. In this embodiment, requests for information in the form of individual pieces of advice are prioritized by sorting based on performance profile data 320. Thus, the portions of the code in which the most execution time is spent are focused on. However, in other embodiments, different selection criteria may be used. For example, advice could be prioritized based on code size reduction, or on power consumption reduction.

Compile time loop information is generated by the compiler. For example, the estimated # cycles per iteration. Compile time information is stored in the consultant intermediate files. Consultant adds this information into the profile server dataset.

Consultant plug-in 310 calls upon the translator DLL 312 to read in consultant intermediate files 304 and create the two types of information supplied to the rest of the tuning system. The first is the loop table information to be displayed in the profile viewer. The loop table information is not given to the profile viewer directly, but is given to the profile server. The second type of information is the advice for individual loops, or loop advice, which is displayed in a consultant tab of the dashboard advice window 210.

The consultant translator creates advice for users by combining parameterized information contained in intermediate files 304 with consultant template files 313–316. The consultant template files contain not only numbered parameters that are filled in from the .cif files, but also references to other templates. A format for the intermediate file of the compiler is defined in Appendix A. A format for consultant template files is described in Appendix B.

The consultant intermediate information contained in the cif file is formatted in xml. Extensible Markup Language (XML) is a simple, very flexible text format derived from SGML (ISO 8879). Originally designed to meet the challenges of large-scale electronic publishing, XML is also playing an increasingly important role in the exchange of a wide variety of data on the Web and elsewhere. The translator uses a standard XML parser to read in a .cif file. The XML parser validates the .cif file against an XML schema.

If the file does not match the schema, the file is not processed any further and the user is notified of the error. Of course, one skilled in the art will realize that the use of XML is for convenience in this embodiment and is by no means a required aspect.

As the file is parsed, the translator creates C++ classes for each of the different types of compiler information. These classes are later used to create the loop table information and loop advice that is provided to the user via the user interface.

The translator is also called upon to save and read back the C++ class data to a binary stream in the profile server. The translator does this in response to a request by the user to save or load a profile dataset.

FIG. 4 is a more detailed view of advisory screen 105.2 displayed by the consultant tool on the user interface of the system of FIG. 1A. The compiler generates specific actions or recommendations for each advice type given, for example: alignment advice for a data item, or advice on eliminating loop overhead. In this embodiment, the compiler may generate two, or more, versions of a loop; one for the case where the trip count is above a certain value and another one for the case in where the trip count is below a certain value. This extra loop is referred to herein as a redundant loop. Advisory screen 105.2 illustrates loop performance for five different loops 400.1–400.5. Consultant places loop table information into a profile server dataset. The profile viewer obtains the loop table information from a profile server, and displays it to the user. Columns 402–403 provide iteration cycles and start-up cycles, respectively, for each loop; this information is provided by the compiler as a static estimate. The profile server may be invoked after the object files(s) are executed either on a target system or by simulation and dynamic information can then be displayed. Consultant places compile time loop information and any calculated run time loop profile information into the profile server dataset. It does so by annotating the appropriate table rows for each individual loop.

In order to synchronize a dataset row with the corresponding run time loop profile information in the dataset, consultant uses the loop identifier as a search key in the dataset. The loop identifier is a unique identifier for each loop created by the compiler. The loop identifier is stored in both the consultant intermediate files and in the dwarf loop section of the target executable file. Consultant intermediate information records the loop identifier when it reads in the consultant intermediate files. Profile server records the loop identifier when it reads in the dwarf loop section of the target executable file to collect run time loop profile information. If a matching row is found, consultant replaces the annotation data for that row. If a matching row is not found, consultant creates a new row and adds the corresponding annotation data.

The unique identifiers provided by the profile server for the dataset, row and column are used to synchronize the loop that is currently selected in the profile viewer display with the information contained in consultant. The dataset identifier is created by the profile server and returned to its clients when they open a profile dataset, so both profile viewer and consultant will have this identifier. The row and column identifiers will be stored in the dataset. Profile viewer will obtain these when it reads in the dataset for display. When the user clicks on a specific cell, profile viewer will pass the dataset, row, and column identifiers to consultant in the act::oncellclicked( ) event notification.

Analysis column 404 provides a summary of the analysis of each loop that is taken from the cif files, as described above. Underline items can be clicked on to get additional information. For example, clicking on "redundant loop" 410 brings up a dialog box illustrated in FIG. 5. The "explanatory text" is representative of text that is provided to explain whatever term is clicked on. Table 2 provides a few examples of explanatory text; however, this is by no means a complete list. Any number of terms may be provided with explanatory text. Note, underlined text provides a hyperlink that can be clicked on for more information.

TABLE 2 examples of Explanatory Text

| term | Explanatory text |
|---|---|
| Redundant loop | A software-pipelined loop has a minimum trip count requirement for safety. If the compiler cannot guarantee that the minimum trip count will be sufficiently large, the compiler will generate two version of the loop, a pipeline and un-pipelined version and select between them at run time based on the actual trip count. The un-pipelined version is referred to as the redundant loop. |
| Minimum trip count | A minimum number of times that a loop must be executed in order for loop to fill the execution pipeline of the processor on which it is executed. This will vary depending on length of the loop. For example, for a pipeline length of six stages, the minimum trip count for a two cycle loop would be three. |

Advice column 405 indicates if advice is available for the associated loop and the number of advices. For example, for the third loop 400.3 there are three pieces of advice: alignment advice for variable y, alignment advice for variable x, and advice for eliminating redundant loops. Clicking on "byes" 412 brings up advice window 600, as shown in FIG. 6, which illustrates an advice screen that include a problem explanation and guidance on how to supply the additional information to resolve the problem.

Advice window 600 provides the source code file name, function name and line number. If the loop is inlined, the file name and line numbers from which the loop was inlined are included. This information includes an HTML link with associated vbscript (VBScript, Microsoft's Visual Basic Scripting Edition, is a scaled down version of Visual Basic) that can be used to bring up the source code in a source code editor of the IDE. If the—mw option was set, the name of the assembly file is provided. This information includes an HTML link with associated vbscript to bring up the source code for the assembly file in the IDE editor. Window 600 also includes a partial listing of the source code in which the loop for which an optimization problem was encountered is highlighted, as illustrated at 610.

A filtered list of the analysis information is created by the compiler, as described above. A list of HTML internal links to the beginning of each separate piece of advice is created by the consultant. Each piece of advice contains one or more specific actions or recommendations for a single issue encountered by the compiler. The text associated with the HTML internal link specifies the advice type.

The consultant uses the advice type information in the consultant advice-types template file 313 (FIG. 3) to create the advice list in the advice window. For example, advice 601 concerns alignment advice for a variable referred to as "y." Suggestion 602 provides the user with guidance on how to supply the additional information for this problem. Alternate suggestion 603 provides further guidance on how to supply additional information. Window pane 604 provides a means to move to the other two pieces of advice associated with this loop. The problem explanation and suggestion text for this one advice is illustrated in Table 3. Each advice that is provided to the user is explained in a similar manner with an explanation of a problem and an associated suggested guidance on how to supply additional information to help resolve the problem. The guidance may suggest pragmas, compiler options, nasserts, etc., as appropriate.

TABLE 3

Advice example

| | Explanatory text |
|---|---|
| Problem | Y[0] (file B.c:11) is known to have an alignment of 2 bytes. The compiler could access multiple elements y[I] with a single instruction if it could guarantee that y[0] was 4-byte aligned. |
| Suggestion | If you know that the alignment of y[0] is at least 4-bytes, add the assertion__nassert((int) & (y[0]) % 4 = = 0) |
| Alternative suggestion | If y[0] is not 4-byte aligned and y is not a structure field, you can force an alignment of 4-byte by adding a DATA ALIGN pragma immediately before the declaration of the y. If the declaration of y is in another function, within file fileB.c, you must compile with -o3 or add the assertion__nassert((int) & (y[0]) % 4 = = 0) If the declaration of y is in a file other than fileB.c, you must compile both files with -pm -o3 or add the aforementioned assertion. |

FIG. 7 illustrates an example 700 of how to supply additional information. By clicking on the link "example" 701, dialog box 700 is opened that shows the user exactly how to provide the needed information. In this example, loop 610 is under examination. Dialog box 700 shows an example of how to add a _nassert directive as suggested in panel 602.

FIG. 8 illustrates another example 800 of how to supply additional information. By clicking on the link "C example" 801, dialog box 800 is opened that shows the user exactly how to provide the needed information. In this example, dialog box 800 illustrates how a data_align pragma is added to the source C code, as suggested by panel 603. Alternatively, a C++ example could have been selected, for example.

The behavior of a compiler can be controlled to some extent by compiler options and assertions given to the compiler either directly or indirectly via a GUI (graphical user interface) or build environment.

There are at least 4 categories of compiler options:
1) A universal option that is virtually always safe and profitable. This is typically indicated as "–O" (equivalently –O2). There are also more aggressive levels of optimizations.
2) Options that make assertions about program behavior (e.g., no two parameters alias). These options enable optimizations that might not always be safe. Compilers typically have many of these.
3) Options that control optimizations that are not always profitable. Compilers may have many, few or none of these.
4) Options to aid in debugging that often hurt performance. These options should be removed before performance tuning.

Thus, the best performance of compiled code depends on proper option selection. The consultant makes recommendations on options based on current options and compile-time analysis of code. For example, if the compiler is using too low a level of optimization or none at all, the consultant will recommend a higher level of optimization. This falls into category 1.

The consultant will recommend options in Category 2 if it appears that it is worth the user's time to determine whether a given option is safe. In particular, sometimes the compiler knows an optimization is safe. Sometimes, the compiler knows an optimization is unsafe. Sometimes, the compiler is not sure.

When the compiler wants to apply an optimization but is not sure it is safe, the consultant will recommend an option in category 2. Note that the consultant will not recommend an option in category 2 if the compiler knows that option is unsafe.

Similarly, the compiler could recommend options in category 3 if it appears likely that they would be profitable.

If the user turns on options that hurt performance, such as category 4, the consultant will recommend removing them.

The compiler of the present embodiment supports three other means to communicate information to the compiler. Nasserts are assertions about variables that are entered into the code. Examples of this are asserting that a variable will always be at least 5 or that a variable is always divisible by 2.

Some pragmas also make assertions and are similar to nasserts. For example, the compiler of the present embodiments supports pragmas that tell the compiler information about a loop. For example, "this loop iterates at least 3 times", "this loop iterates an even number of times." and "this loop iterates at most 1000 times." Other pragmas tell the compiler what to do. For example, the present compiler supports a pragma that tells the compiler to apply a given optimization. If the compiler can apply the optimization, then it will.

Restricts/consts are qualifiers on variable declarations. They tell the compiler certain properties of pointer variables. For example, const tells the compiler "data pointed to by this variable is read but never written".

Restrict and const qualifiers give the compiler more freedom to reorder memory accesses and get better schedules that let the code run faster.

All of these (except pragmas to control optimizations) are termed "point-recommendations". They recommend that users add information into the source code if a given condition is true at this point in the program or with respect to a given variable. While this is more tedious than making a sweeping statement for the entire application, users shun sweeping statements because it's difficult to be sure that the statement holds true everywhere or for every variable.

Hence, users tend to avoid sweeping assertions in favor of correctness, thereby sacrificing performance. Additionally, the assertion might hold for some points/variables but not for all.

It is much easier to determine whether an assertion is true for a single point or variable than for everything. Hence, it appears that point assertions should be more popular and have a higher potential for actually getting used.

FIG. 9 illustrates another advice screen with guidance on how to supply the additional information to satisfy another problem, showing an option dialog box that explains the option. In this example, a portion of code 900 is highlighted. Problem explanation 901 is requesting additional information regarding a compiler option that applies to code portion 900, in this case an "mh" option. Suggestion 902 provides guidance on how to supply the additional information. Dialog box 910 provides additional explanatory text in response to clicking on link 903. The problem explanation and suggestion text for this one advice is illustrated in Table 4. It is to be understood that each piece of advice that is provided to the user is explained in a similar manner with an associated suggested guidance on how to supply the additional information to satisfy each piece of advice.

TABLE 4

Compiler option example

| | Explanatory text |
|---|---|
| Problem | The compiler would like to schedule one or more load instructions before it is known whether the results will be used. By default, the compiler is not permitted to do this |
| Suggestion | Add the option<br>-mh or -mhn<br>where n is at least 336<br>Make sure your application meets the safety criteria (or can be made to do so) before using this option. |
| Dialog box | The -mh option allow the compiler to speculatively perform a load before it is known whether that load would have been performed in the original code. The compiler cannot do this be default because of the risk of faulting when trying to access an illegal address.<br>This optimization reduces ordering constraints and reduces the need for predication and additional instructions. Hence, it can improve both performance and code size. It is particularly useful for while, do until and other loops which might break out early or have irregular loop control.<br>When you specify a value of -mhn, the compiler is allowed to access +/- n bytes beyond the first/last element accessed during the loop. You then need to ensure that all potential affected data structures have n bytes of readable memory past both ends of the array to prevent faulting. This can be accomplished by a variety of methods from padding arrays to adjusting the linker command file to have n bytes of buffer at either end of your implemented memory.<br>If no argument is provided, the compiler chooses the largest beneficial value of n and reports this number to the assembly file. |

FIG. 10 is a flow chart illustrating operation of the compiler consultant. In step 1000, compilation of a source file is in progress. As discussed above, the compiler tracks optimization opportunities as the code is compiled. The optimization opportunities tracked are related to code segments that the compiler could compile differently if the compiler had additional information. When the compiler reaches a decision point an a particular optimization opportunity, if it does not have enough information to safely perform the optimization then it typically makes a conservative decision not to perform the optimization. As discussed above, if additional information were available to the compiler at this point, then it might be able to perform the optimization. Each such instance of lacking information is recorded for later use by the consultant.

In step 1002, a determination is made as to what additional information is needed for each optimization opportunity. As described above, this may include information about a particular variable type or usage, a minimum or maximum number of times a loop will execute, data alignment, physical memory organization, etc.

In step 1004, the optimization opportunities are filtered to identify those with a high likelihood of yielding better compilation results. This step filters out duplicate requests for more information resulting from multiple encounters with a same variable, for example. The advice is prioritized based on the likelihood of yielding better compilation results. The criteria for "better results" may be provided or selected by the user. For example, for one portion of a program, performance may be the critical factor. For another portion of the program, code size may be more important. In yet another portion, power dissipation during execution may be more important. Various embodiments of the invention may provide different combinations of criteria in a fixed mode or in a selectable manner, for example.

In step 1006, a piece of advice is provided to a user via the user interface of the program development system, as described previously. The advice includes an explanation of an optimization problem 1007 encountered by the compiler and guidance 1008 on how to supply the additional information needed to resolve the problem. As described above, this can be via nasserts, pragmas, compiler option statements, data declarations, etc. Step 1007 is repeated a number of times until the prioritized list of advice has all been presented, or until the process is terminated by the user.

In step 1010, the program is recompiled using the user-supplied information. It should be noted that depending on what type of additional information the user has proved, the compiler might generate a new set of set of advice for various additional optimization opportunities that the compiler may uncover. For example, on a first pass the compiler may need information to decide if a trip count for a loop is less than two, for example. A piece of advice may have been offered that noted a problem for loop counts of less than two. If the user then provided additional information that the loop count would never be less than two, the compiler on the second pass may perform the original optimization and then discover that a different loop count threshold may be of interest. In this case, a new advice is provided.

In another case, the compiler during a second pass may make an optimization based on some additional information provided by the user that results in not even reaching a point for which it provided advice during the first pass. In this case, it might take an entirely different path and discover new optimization opportunities for which it needs additional information. In this case, these new opportunities will be tracked and advice will be provided to the user. One skilled in the art will appreciate that many permutations of optimization can results, depending on what additional information is provided by the user. Advantageously, the consultant continues to offer new advice for each pass of the compilation process.

In step 1012, the results of the compilation are evaluated by executing or simulating the execution of the compiled object code. Various performance tools may be used in this step, including the profile server, for example. This entire sequence may be repeated a number of times until the user is satisfied with the results. As discussed with regard to step 1010, each new compilation pass may result in a new set of advice based on new optimization decisions the compiler has made in response to the additional information being provided. For each pass, additional information may be provided that further improves the optimization process.

In another embodiment, step 1008 will solicit information from the user in a query fashion. In this case, the consultant will use answers provided by the user via the user interface to automatically annotate the source code with the additional information based on responses from the user.

In another embodiment, step 1008 will provide advice to the user in a query fashion, similar to the process above. However, in this case, the consultant will use answers provided by the user via the user interface to automatically insert changes into the compiled code based on the additional information provided by the user. In this case, incremental compilation would occur as the user provides requested information and step 1010 would not need to be performed. Alternatively, compilation could instead be performed in step 1010.

Thus, a user is provided with a tool that will provide advice to the user regarding specific small segments of source code. Based on this advice, the user may provide additional information that will enable the compiler to provide optimizations that the compiler could not do based on information otherwise available to the compiler. In one embodiment, the consultant will suggest that the user add nasserts, pragmas or restrict/const qualifiers if a given condition is met. The consultant details the conditions with explanations and examples.

Another embodiment of the consultant recommends pragmas to enable compiler optimizations based on assertions about program behavior; for example: no two parameters alias. These options enable optimizations that might not always be safe.

The compiler keeps track of what information is needed to improve optimization while compiling the application as usual, except with the addition of an extra option requesting the compiler to gather this information. Whenever the compiler cannot apply an optimization because it does not know whether the optimization would be safe, it notes that a given point assertion would make this optimization safe.

A later step in the compiler filters this information so that it is not requested multiple times. The consultant is simply a graphical tool for presenting this information back to the user.

Various embodiments of the compiler consultant are associated with a particular compiler and are adjusted to be aware of the idiosyncrasies of the associated compiler. This is generally done by customizing the advice and example template files. The format of the CIF files is adjusted a needed to be compatible with the associated compiler.

While the invention has been described with reference to illustrative embodiments, this description is not intended to be construed in a limiting sense. Various other embodiments of the invention will be apparent to persons skilled in the art upon reference to this description. For example, a code segment is the range of code upon which Consultant gives advice. The range is typically the start and end of a loop. The word loop is used synonymously with code segment throughout the document, although other embodiments may include advice for non-loop code.

While the user interface has been described herein as a graphical user interface (GUI), a GUI is not required. Another embodiment may use a simple text only display for presenting the advices, for example. In another embodiment may, advices may be dumped to a file, or sent to a printer, for example.

The use and formats of the various temporary files (.cit, cif, templates, examples, etc) is not critical to the invention. Other embodiments may use different means of tracking needed information and providing problem descriptions and suggestions.

It is therefore contemplated that the appended claims will cover any such modifications of the embodiments as fall within the true scope and spirit of the invention.

Appendix A: Consultant Intermediate File Specification

```
<ci_XML version_number=vn, mini_version_number="vn">

<file_tbl>
    <file_tbl_entry name="s">
    </file_tbl_entry>
    <!-- optional additional file tbl entries -->
    <!-- if no entries, file tbl may be omitted -->
</file_tbl>

<func_tbl>
    <func_tbl_entry name="s" file_tbl_idx=x first_ln=a last_ln=b>
    </func_tbl_entry>
    <!-- optional additional func tbl entries -->
    <!-- if no entries, func tbl may be omitted -->
</func_tbl>

<sym_tbl>
    <sym_tbl_entry name="s" file_tbl_idx=x ln="1">
    </sym_tbl_entry>
    <!-- optional additional sym tbl entries -->
    <!-- if no entries, sym tbl may be omitted -->
</sym_tbl>

<ref_tbl>
    <ref_tbl_entry name="s" file_tbl_idx=x ln=l>
    </ref_tbl_entry>
    <!-- optional additional ref tbl entries -->
    <!-- if no entries, ref tbl may be omitted -->
</ref_tbl>

<template_tbl>
    <template_tbl_entry type="t" name="s">
    </template_tbl_entry>
    <!-- optional additional template tbl entries -->
    <!-- if no entries, template tbl may be omitted -->
</template_tbl>

<loop_tbl>
    <loop_tbl_entry>
        <src func_tbl_idx="x" first_ln="a" last_ln="b" lang="s" id="s"> </src>
        <thruput template_idx="x" ... > // Cycles per Iteration column
            </thruput>
            ...
        <startup template_idx="x" ... > // Prolog cycles column
            </startup>
            ...
        <misc template_idx="x" ... > // Analysis column
            </misc>
            ...
        <short_advice template_idx="x" type="s"... > // Advice List column (Lists types of Advice)
```

```
        </short_advice>
      <!-- 0 or more misc or short_advice possible      -->
      <!-- exactly one of startup, thruput              -->
    </loop_tbl_entry>
    <!-- optional additional loop tbl entries  -->
    <!-- if no entries, loop tbl may be omitted -->
</loop_tbl>

<!-- XML example of a comment -->
<!-- KEY -->
<!-- s = char string -->
<!-- a = int where a<=b -->
<!-- b = int where b>=a -->
<!-- x = int -->
<!-- vn = version number (int) -->
<!-- t = template type: short_advice, example, misc, definition -->
</ci_XML>
```

All templates (advice, definitions, misc analysis, examples etc.)
are HTML files with optional char strings to be replaced by
a fixed number of parameters. A comment at the beginning
specifies the expected number and types of parameters for tools to sanity check against.

Other information may be in XML file but should be ignored.

Example .cif file:

```
<ci_XML version_number="4.25">

<file_tbl>
   <file_tbl_entry name="D:\consultant\test\aet\main.c"></file_tbl_entry>
 </file_tbl>

<func_tbl>
   <func_tbl_entry name="InitSideA" file_tbl_idx="0" first_ln="106" last_ln="112"></func_tbl_entry>
   <func_tbl_entry name="InitSideB" file_tbl_idx="0" first_ln="114" last_ln="123"></func_tbl_entry>
   <func_tbl_entry name="WatchDog" file_tbl_idx="0" first_ln="134" last_ln="142"></func_tbl_entry>
   <func_tbl_entry name="SumAB" file_tbl_idx="0" first_ln="125" last_ln="132"></func_tbl_entry>
   <func_tbl_entry name="main" file_tbl_idx="0" first_ln="40" last_ln="104"></func_tbl_entry>
 </func_tbl>

<template_tbl>
   <template_tbl_entry type="thruput" name="thruput"></template_tbl_entry>
   <template_tbl_entry type="startup" name="startup"></template_tbl_entry>
   <template_tbl_entry type="short_advice" name="perf_deg"></template_tbl_entry>
   <template_tbl_entry type="thruput" name="thruput_unroll"></template_tbl_entry>
   <template_tbl_entry type="misc" name="res_bnd"></template_tbl_entry>
   <template_tbl_entry type="misc" name="unroll"></template_tbl_entry>
   <template_tbl_entry type="thruput" name="na"></template_tbl_entry>
```

```xml
<template_tbl_entry type="misc" name="fail"></template_tbl_entry>
<template_tbl_entry type="misc" name="call"></template_tbl_entry>
<template_tbl_entry type="short_advice" name="call"></template_tbl_entry>
<template_tbl_entry type="short_advice" name="auto_inline"></template_tbl_entry>
</template_tbl>

<loop_tbl>
 <loop_tbl_entry>
   <src func_tbl_idx="0" file_tbl_idx="0" first_ln="108" last_ln="111" lang="C"></src>
   <thruput template_idx="0" s1="1"></thruput>
   <startup template_idx="1" s1="6"></startup>
   <short_advice template_idx="2" s1="-g"></short_advice>
 </loop_tbl_entry>

<loop_tbl_entry>
   <src func_tbl_idx="1" file_tbl_idx="0" first_ln="119" last_ln="122" lang="C"></src>
   <thruput template_idx="3" s1="2" s2="0.666667" s3="3"></thruput>
   <startup template_idx="1" s1="6"></startup>
   <misc template_idx="4" s1="2"></misc>
   <misc template_idx="5" s1="3"></misc>
   <short_advice template_idx="2" s1="-g"></short_advice>
 </loop_tbl_entry>

<loop_tbl_entry>
   <src func_tbl_idx="2" file_tbl_idx="0" first_ln="138" last_ln="141" lang="C"></src>
   <thruput template_idx="0" s1="2"></thruput>
   <startup template_idx="1" s1="6"></startup>
   <misc template_idx="4" s1="2"></misc>
   <short_advice template_idx="2" s1="-g"></short_advice>
 </loop_tbl_entry>

<loop_tbl_entry>
   <src func_tbl_idx="3" file_tbl_idx="0" first_ln="128" last_ln="131" lang="C"></src>
   <thruput template_idx="3" s1="3" s2="1.5" s3="2"></thruput>
   <startup template_idx="1" s1="6"></startup>
   <misc template_idx="4" s1="3"></misc>
   <misc template_idx="5" s1="2"></misc>
   <short_advice template_idx="2" s1="-g"></short_advice>
 </loop_tbl_entry>

<loop_tbl_entry>
   <src func_tbl_idx="4" file_tbl_idx="0" first_ln="70" last_ln="78" lang="C"></src>
   <thruput template_idx="6"></thruput>
   <startup template_idx="1" s1="0"></startup>
   <misc template_idx="7"></misc>
   <misc template_idx="8"></misc>
   <short_advice template_idx="2" s1="-g"></short_advice>
   <short_advice template_idx="9" F1="0"></short_advice>
 </loop_tbl_entry>

<loop_tbl_entry>
```

```xml
    <src func_tbl_idx="4" file_tbl_idx="0" first_ln="95" last_ln="98" lang="C"></src>
    <thruput template_idx="6"></thruput>
    <startup template_idx="1" s1="0"></startup>
    <misc template_idx="7"></misc>
    <misc template_idx="8"></misc>
    <short_advice template_idx="2" s1="-g"></short_advice>
    <short_advice template_idx="10" s1="33" F2="0"></short_advice>
  </loop_tbl_entry>

</loop_tbl>

</ci_XML>
```

Appendix B: Consultant Template Files Format

The XML file lists template as follows:

<template_name template_idx="n" attributes /> where n is an integer. n is an index into the template table which is also included in the XML file.

The template table lists the template library and the base name of the template. If the GUI cannot find the template <base-name..template, it should look for <base_name>_C.template or base_name_SA.template, depending on whether the file name associated with the current loop is a C/C++ file or serial assembly file, resp. (Serial assembly implies .sa suffix.)

Each template library has its own directory. Each .template file in this directory contains one template. The template has a header embedded in a comment field which specifies number of parameters and their types for type checking purposes.

The GUI knows how to substitute parameters into templates. The substitution strategy is independent of the specific template.

If the template embeds the string ##n##, the GUI substitutes the nth parameter. If the string is #n|qual##. the GUI substitutea a string dictated by the qualifier which is derived from the nth parameter.

The list of qualifiers is:

f - functions:

first - line 1 of file
last - last line of file
func - func name
file - file name F - files:

file - file name
first - line 1 of file
last - last line of file v - variables/symbols:

name_loc - sym (file:line)
if (file != NULL && line != 0) sym
otherwise:
sym - symbol name
file - file were decl occurs
line - line number of decl r - refs:

name_loc - ref (file:line)
if (file != NULL && line != 0)
ref otherwise
ref - string for reference
file - file were ref occurs
line - line number of ref s - strings:

<no qualifiers>

For example,

Templates can also contain links to other templates (eventually they may contain links to other places as well.)
The links are represented by:
^^^<letter>|<template name w/out suf>|<no. parms>|<|-separated parm list|<text to underline>^^^.
The letters are:

D - definition template
E - example template

For example, a restrict advice template might look as follows:

```
<!-- 3 vvf -->
...
The compiler cannot tell that variables ##1|sym##
(##1|file##:##1|line##) and
##2|sym## (##2|file##:##2|line##) do not alias.
If ##1|sym## cannot alias other variables in ##3|func##
consider
^^^L|restrict|2|2|1|restrict qualifying^^^ ##1|sym##.
Alternatively, if ##2|sym## cannot alias other variables in
##3|func##, consider restrict qualifying ##2|sym##.
```

The link then expands to:

<A HREF="#"
onclick="window.open('http://www.micro.ti.com/asp/sds/clints/html/consultant/Templates/LongAdvice/restrict.html
','Definition','scrollbars=yes,width=300,height=300,screenX=10,screenY=10')">restrict qualifying</A> with the second and first parameters (in that order) substituted into the
two-parameter template restrict.template before displaying it.

A template with no parameters (e.g., a definition template might look as follows:
```
<!-- 0 -->
...
<center> Resource Bound </center>
The minimum cycle count for loop body considering
only resource constraints.
...
```

A reference to the 0-parameter definition template restrict.HTML is encoded as:
^^^D|restrict|0|restrict qualifying ##1|sym##^^^.

Thruput and Misc templates are intended to be bullet items. Short advice, definitions and examples are intended to be used in full windows. Html wrappers are needed around the latter three.

13.1 Example Template File

```
<!-- 6 vrrsss -->

<CENTER>
<H2>Alignment Advice for ##1|sym##</H2>
</CENTER>

<H3>Problem:</H3>

<P>
##3|ref## (##3|file##:##3|line##)
is known to have an alignment of ##4## bytes.
The compiler could access multiple elements ##2|ref## with
a single instruction if it could guarantee that ##3|ref##
was ##5##-byte aligned.
</P>

<HR>

<H3>Suggestion:</H3>

<P>
If you know that the alignment of ##3|ref## is at least
##5##-bytes, add the assertion
<CENTER>
_nassert((int) &(##3|ref##)%##5## == 0);
</CENTER>
</P>

<CENTER>
<TABLE CELLPADDING="10"><TR><TD>

^^E|align_tell|0|Example^^

</TD></TR></TABLE>
</CENTER>

<HR>

<H3>Alternate Suggestion:</H3>

<P>
If ##3|ref## is not ##5##-byte aligned and ##1|sym## is not a structure
field, you can force an alignment of ##5## byte by
adding a ^^D|data_align|0|DATA_ALIGN pragma^^ immediately
before the declaration of the ##1|sym##.
</P>
<P>
If the declaration of ##1|sym## is in another function
within file ##2|file##, you must compile with
```

^^D|optlevel|0|-o3^^ or
add the assertion
<CENTER>
_nassert((int) &(##3|ref##)%##5## == 0);
</CENTER>
</P>
<P>
If the declaration of ##1|sym## is in a file other than
2|file##, you must compile both files with ^^D|optlevel|0|-pm -o3^^ or
add the aforementioned assertion.
</P>

<CENTER>
^^E|data_align|1|##5##|Example^^
</CENTER>

What is claimed is:

1. A method for selective solicitation of assistance from a user for optimization of compiled code, the method comprising the steps of:
   tracking optimization opportunities as the code is compiled with a first set of compiler options wherein the optimization opportunities tracked are related to code segments that a compiler could compile differently with a different set of compiler options if the compiler had additional information;
   determining what additional information is needed for each optimization opportunity; and
   presenting a plurality of advices to a user interface, wherein each advice comprises an explanation of an optimization problem that requires additional information and guidance on how to supply the additional information for selecting the different set of compiler options.

2. The method of claim 1 further comprising the step of filtering the optimization opportunities to identify those with a high likelihood of yielding better compilation results.

3. The method of claim 1 in which the step of presenting a plurality of advices further comprises presenting the plurality of advices in a prioritized order of importance.

4. The method of claim 1, further comprising the steps of:
   determining as the code is compiled that a particular compiler option in the first set of compiler options in the compiled code is detrimental to the optimization opportunities; and
   recommending via the user interface that the particular compiler option be removed.

5. A method for selective solicitation of assistance from a user for optimization of compiled code, the method comprising the steps of:
   tracking optimization opportunities as the code is compiled with a first set of compiler options wherein the optimization opportunities tracked are related to code segments that a compiler could compile differently with a different set of compiler options if the compiler had additional information;
   determining what additional information is needed for each optimization opportunity;
   presenting requests for the additional information to a user interface; and
   inserting optimization changes into the compiled code for selection of the different set of compiler options automatically based on the additional information provided via the user interface.

6. The method of claim 5 further comprising the step of filtering the optimization opportunities to identify those with a high likelihood of yielding better compilation results.

7. A software development system, comprising:
   a memory storage system holding a software development tool program;
   a host computer connected to the memory storage system, the host computer operable to execute the software development tool program;
   a user interface connected to the host computer;
   an access mechanism for connecting to a hardware system, the hardware system being operable to execute an application program; and
   wherein the software development tool includes a compiler for compiling code for the application program, the compiler operable to selectively solicit assistance for optimization of the compiled code by performing a method comprising the steps of:
   tracking optimization opportunities as the code is compiled with a first set of compiler options wherein the optimization opportunities tracked are related to code segments that a compiler could compile differently with a different set of compiler options if the compiler had additional information;
   determining what additional information is needed for each optimization opportunity;
   presenting requests for the additional information to the user interface; and
   providing the user interface with guidance on how to supply the additional information for each request for selecting the different set of compiler options.

8. The method of claim 7 further comprising the step of filtering the optimization opportunities to identify those with a high likelihood of yielding better compilation results; and
   wherein the step of determining comprises determining what additional information is needed for each filtered optimization opportunity.

9. The method of claim 7 in which the step of presenting requests for the additional information is further comprised of presenting the requests in a prioritized order of importance.

10. A digital system, comprising:
    a memory storage system holding a program;
    a processor connected to the memory storage system, the processor operable to execute the program; and
    wherein the program was compiled by a compiler, the compiler operable to selectively solicit assistance for optimization of the compiled code by performing a method comprising the steps of:
    tracking optimization opportunities as the code is compiled with a first set of compiler options wherein the optimization opportunities tracked are related to code segments that a compiler could compile differently with a different set of compiler options if the compiler had additional information;
    determining what additional information is needed for each optimization opportunity;
    presenting requests for the additional information to a user interface; and
    providing the user interface with guidance on how to supply the additional information for each request for selecting the different set of compiler options.

11. The method of claim 10 further comprising the step of filtering the optimization opportunities to identify those with a high likelihood of yielding better compilation results; and
    wherein the step of determining comprises determining what additional information is needed for each filtered optimization opportunity.

12. The method of claim 10 in which the step of presenting requests for the additional information is further comprised of presenting the requests in a prioritized order of importance.

13. A digital system, comprising:
    a processor for executing software code; and
    a memory connected to the processor for holding a software program code, wherein the software program code was tuned using a method for selective solicitation of assistance from a user for optimization of compiled code, the method comprising the steps of:
    tracking optimization opportunities as the code is compiled with a first set of compiler options wherein the optimization opportunities tracked are related to code segments that a compiler could compile differently with a different set of compiler options if the compiler had additional information;

determining what additional information is needed for each optimization opportunity; and presenting a plurality of advices to a user interface, wherein each advise comprises an explanation of an optimization problem that requires additional information and guidance on how to supply the additional information for selecting the different set of compiler options.

* * * * *